United States Patent
Dalal

(10) Patent No.: US 6,296,235 B1
(45) Date of Patent: Oct. 2, 2001

(54) AUTOMOBILE STABILIZATION ASSEMBLY

(76) Inventor: Adwait R. Dalal, 1842 N. Jansen, Wichita, KS (US) 67212

( * ) Notice: Subject to any disclaimer, the term of this patent is extended or adjusted under 35 U.S.C. 154(b) by 0 days.

(21) Appl. No.: 09/419,042

(22) Filed: Oct. 15, 1999

(51) Int. Cl.⁷ .................................................. F16F 5/00
(52) U.S. Cl. .............................. 267/64.16; 280/124.106
(58) Field of Search ..................... 280/124.106, 124.159; 267/64.16

(56) References Cited

U.S. PATENT DOCUMENTS

| | | | | |
|---|---|---|---|---|
| 2,779,587 | * | 1/1957 | Thomas | 267/11 |
| 3,090,611 | * | 5/1963 | Schultze | 267/11 |
| 3,328,019 | * | 6/1967 | Wilson | 267/11 |
| 3,572,679 | * | 3/1971 | Strauff | 267/64 |
| 3,606,374 | * | 9/1971 | Capgras | 280/112 |
| 3,736,000 | * | 5/1973 | Capgras | 280/124 F |
| 3,871,635 | * | 3/1975 | Unruh et al. | 267/11 |
| 3,897,940 | * | 8/1975 | Gele | 267/64 R |
| 4,371,182 | * | 2/1983 | Brown | 280/6 H |
| 4,606,551 | * | 8/1986 | Toti et al. | 280/772 |
| 4,752,062 | * | 6/1988 | Domenichini | 267/186 |
| 5,046,008 | * | 9/1991 | Dieter | 364/424.05 |
| 5,447,332 | * | 9/1995 | Heyring | 280/772 |
| 5,480,186 | * | 1/1996 | Smith | 280/772 |
| 5,556,115 | * | 9/1996 | Heyring | 280/6.12 |
| 5,601,307 | * | 2/1997 | Heyring | 280/707 |
| 5,794,966 | * | 8/1998 | MacLeod | 280/714 |
| 5,899,472 | * | 5/1999 | Burke et al. | 280/124.106 |
| 5,915,701 | * | 6/1999 | Heyring | 280/6.155 |
| 6,010,139 | * | 1/2000 | Heyring et al. | 280/124.04 |

* cited by examiner

Primary Examiner—Douglas C. Butler
Assistant Examiner—Benjamin A Pezzlo
(74) Attorney, Agent, or Firm—Davis & Jack, L.L.C.; Kenneth H. Jack

(57) ABSTRACT

An automobile stabilizing assembly consisting of a hydraulic fluid filled right cylinder, the interior space of the right cylinder having first, second, and third walls, such walls dividing the right cylinder into first and second chambers, the first and second walls having a piston shaft apertures therethrough, the right cylinder having first and second hydraulic fluid exchange ports extending into its first chamber; a right piston assembly having first and second pistons slidably mounted within the chambers of the right cylinder, and a right piston shaft extending through the piston shaft apertures, the right piston shaft interconnecting the first and second pistons, the second piston having motion damping apertures extending therethrough, the first piston being positioned for sliding motion between the first and second hydraulic fluid exchange ports; a left cylinder similarly configured with the right cylinder; a left piston assembly within the left cylinder, the left piston assembly being similarly configured with the right piston assembly; and first and second hydraulic fluid carrying tubes cross connecting the hydraulic fluid exchange ports of the left and right cylinders.

8 Claims, 2 Drawing Sheets

AUTOMOBILE STABILIZATION ASSEMBLY

FIELD OF THE INVENTION

This invention relates to apparatus and assemblies for stabilization of automobiles during cornering. More particularly, this invention relates to such apparatus adapted for accomplishing such stabilization through transferral of pressure forces exerted upon outside wheels upon cornering to inside wheels upon cornering.

BACKGROUND OF THE INVENTION

The chassis and body of an automobile typically experiences a rolling motion upon cornering, such motion typically leaning the chassis and body of the automobile away from the direction of the turn. Upon such rolling motion, outside springs and struts of the automobile's suspension are compressed or shortened while inside springs and struts are rarified or lengthened. Such rolling motion of the chassis and body of an automobile upon turning undesirably creates pressure differentials between the inside wheels and outside wheels, resulting in overall decreased cornering traction. Also, such rolling motion upon cornering may undesirably shift the vehicle's center of gravity away from its optimum position for cornering.

The instant inventive automobile stabilization assembly counteracts such undesirable rolling motion upon cornering by modifying conventional wheel motion dampers (i.e., shock absorbers) of an automobile to additionally serve as two way hydraulic rams. Hydraulic lines laterally interconnect such modified dampers so that upon steering the automobile through a turn, compressive forces exerted upon outside wheel damper cause the inside wheel damper to move the inside wheels upwardly with respect to the chassis, leveling the automobile through the turn.

BRIEF SUMMARY OF THE INVENTION

The instant inventive automobile stabilization assembly preferably comprises four modified wheel motion dampers. According to the invention, the hydraulic fluid reservoirs of the dampers are preferably laterally divided by an interior partitioning wall so that pistons having motion damping channels therethrough may underlie the partitioning walls and so that the piston shafts of the dampers may extend upwardly from such pistons through closely fitted piston shaft receiving apertures within the partitioning walls.

Above the partitioning walls, and within the upper chambers defined thereby, second pistons, preferably imperforate, are fixedly attached to the piston shafts so that, as the piston shafts move longitudinally with respect to their cylinders, the imperforate pistons slidably move within the cylinders. Such sliding motion effectively drives and draws hydraulic fluid in the manner of a two way hydraulic ram. Preferably, the piston shafts extend upwardly from the upper surfaces of the imperforate pistons to extend through closely fitted piston shaft receiving apertures extending through the upper walls of the cylinders. Suitably, the two way hydraulic rams may be situated in parallel configurations with respect to the dampers. However, utilization of the above described in-line configuration is preferable due to reduction in mechanical complexity, space economy, and cost economy resulting from use of the in-line configuration.

In order to allow motion of the piston shafts within modified wheel motion dampers, hydraulic fluid exchange ports preferably extend through the cylinder walls, above and below the imperforate pistons. Preferably, each hydraulic fluid exchange port is adapted for fixed attachment of a hydraulic line or tube.

In installing the inventive assembly upon an automobile, assuming the preferred in-line configuration is utilized, the conventional wheel motion dampers of all four wheels are preferably replaced with dampers modified as described above. Hydraulic lines are preferably installed, such lines preferably laterally interconnecting both the front and rear pairs of modified dampers so that each lower hydraulic fluid exchange port may transmit hydraulic fluid to the upper hydraulic fluid exchange port of the laterally opposing damper.

Preferably, the flow of hydraulic fluid through the laterally crossing hydraulic lines is controlled by pilot actuated check valves, such valves delaying the onset of flow of hydraulic fluid in a line experiencing low pressure while the opposing line is at a relative high pressure.

It is also preferable that floating piston gas cushion cylinders be utilized in the assembly, each such cylinder having hydraulic fluid on one side of the floating piston and having compressed nitrogen gas on the other side of the piston. It is preferable that such floating piston cylinders be utilized for relieving excess pressure both above and below the imperforate pistons within the upper chambers of the left and right cylinders. Utilization of such floating piston cylinders provides an overall spring or cushioning effect to the assembly; and such cylinders assure a period of hydraulic fluid pressure differential between the crossing hydraulic lines interconnecting the left and right cylinders.

Accordingly, it is an object of the present invention to provide an automobile stabilization assembly having wheel motion dampers which work in conjunction with two way hydraulic rams for leveling an automobile through a turn.

It is a further object of the present invention to provide such an assembly having laterally crossing hydraulic lines for converting outside wheel compression forces into inside wheel pulling forces.

It is a further object of the present invention to provide such an assembly having floating piston gas cushion cylinders for relieving and cushioning hydraulic pressure and assuring a pressure differential between the laterally crossing hydraulic lines.

Other and further objects, benefits, and advantages of the present invention will become known to those skilled in the art upon review of the Detailed Description which follows, and upon review of the appended drawings.

DETAILED DESCRIPTION OF THE PREFERRED EMBODIMENT

Figure 1:
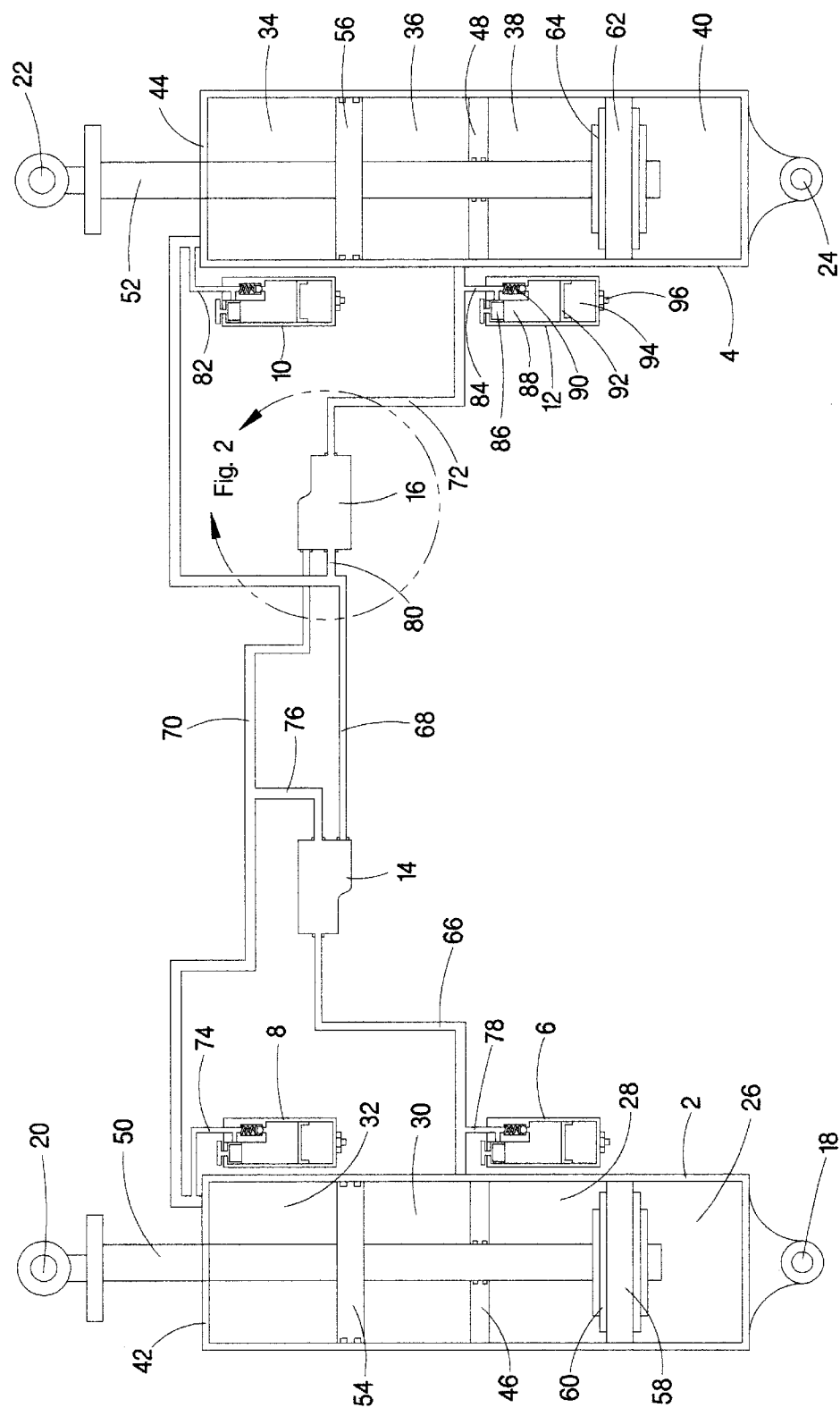
FIG. 1 is a representational schematic of a preferred embodiment of the present inventive automobile stabilization assembly.

Referring now to the drawings, and in particular to FIG. 1, hollow bored left and right cylinders 2 and 4 constitute major structural components of the present inventive assembly. Preferably, the interior spaces of the hollow bored cylinders 2 and 4 have interior partitioning walls 46 and 48, the partitioning walls 46 and 48 having closely fitting apertures facilitating slidable passage therethrough of piston shafts 50 and 52. Each piston shaft 50 and 52 preferably has a pair of pistons 54, 56, 58, and 62 fixed attached thereto, such pistons in combination with partitioning walls 46 and 48 segregating the interior spaces of cylinders 2 and 4 into spaces 26, 28, 30, 32, 34, 36, 38, and 40. Spaces 26 and 28 form a lower chamber of the left cylinder 2 while spaces 30 and 32 form an upper chamber of said cylinder. Similarly, spaces 38 and 40 of the right cylinder 4 form a lower chamber of the said cylinder, while spaces 34 and 36 form an upper chamber of said cylinder. Said upper and lower chambers configured as depicted in FIG. 1 respectively serve as two way hydraulic rams and wheel motion dampers. Suitably, the hydraulic rams and wheel motion dampers may be configured in parallel alignment with respect to each other. However, utilization of the in-line configuration as depicted in FIG. 1 is preferred due to space savings, material cost savings and reduction in mechanical complexity resulting from utilization of the in-line configuration.

Referring again to the preferred configuration depicted in FIG. 1, each lower piston 58 and 62 of cylinders 2 and 4 preferably has flow-through apertures or channels extending vertically therethrough. Preferably, additional resistance to flow of hydraulic fluid through such apertures is generated by flexible spring steel washers 60 and 64 which overlie and underlie such apertures. As the piston shafts 50 and 52 move longitudinally within cylinders 2 and 4, the flow of hydraulic fluid through pistons 58 and 62 dampens motion of the piston shaft s 50 and 52 (and consequently dampens wheel motion with respect to a vehicle) in much the same manner of a conventional wheel motion damper or shock absorber.

Pistons 54 and 56 preferably are imperforate. Also preferably, seals between the piston shafts 50 and 52 and the upper walls 42 and 44 of cylinders 2 and 4, along with seals between said shafts and partitioning walls 46 and 48 are occlusive. Thus, as a result of virtual incompressibility of hydraulic fluid filling spaces 30, 32, 34, and 36, neither of the piston shafts 50 and 52 would be movable with respect to cylinders 2 and 4 in absence of hydraulic fluid pressure relief. Spaces 30 and 32 are contiguous with hydraulic fluid exchange ports to which hydraulic lines 66 and 70 are preferably fixedly attached. Similarly, spaces 34 and 36 preferably have hydraulic fluid exchange ports to which hydraulic lines 68 and 72 are preferably fixedly attached. Hydraulic fluid pressure relief is provided via lines 66, 68, 70, and 72.

Referring further to the preferred configuration depicted in FIG. 1, assuming that eyelet 22 is fixedly and pivotally attached to a chassis member of an automobile, assuming that eyelet 24 is fixedly and pivotally attached to, for example, a lower wheel supporting right "A" arm of the automobile, and assuming a leftward turn of the automobile; rolling motion of the automobile drives eyelet 22 toward eyelet 24. Due to the rigid structure of the piston shaft 52, the piston 56, and of the partitioning wall 48, such pressure upon eyelets 22 and 24 exerts pressure upon hydraulic fluid contained within space 36. Such pressurized fluid then flows through hydraulic line 72 through a flow controlling check valve 16, and thence through hydraulic line 70 to enter space 32 of the left cylinder 2. Hydraulic fluid driven into space 32 of cylinder 2 drives piston 54 away from upper wall 42 causing piston shaft 50 to retract into cylinder 2. Assuming that eyelet 20 is fixedly and pivotally attached to a chassis member of the automobile, and that eyelet 18 is fixedly and pivotally attached to, for example, a lower left wheel supporting "A" arm of the automobile; such retracting motion lowers the left side of the chassis of the automobile, counteracting the rolling motion through the turn, and stabilizing the automobile.

During an opposite turn to the right, compressive forces driving eyelet 20 toward eyelet 18 induce a flow of hydraulic fluid through hydraulic line 66, through flow controlling check valve 14, and thence through hydraulic line 68 to emit into space 34 of right cylinder 1. Thus, upon a rightward turn, compressive forces exerted upon the left wheels of the automobile lower the right side of the chassis of the automobile, leveling the automobile through the turn. Where the suitable alternate parallel configuration described above is utilized, upper and lower ends of rams and dampers preferably span between the linkage points of eyelets 18, 20, 22, and 24 as described above. Upon such parallel configuration installation, the vehicle leveling effect operates substantially identically with that of the preferred in-line configuration.

Figure 2:
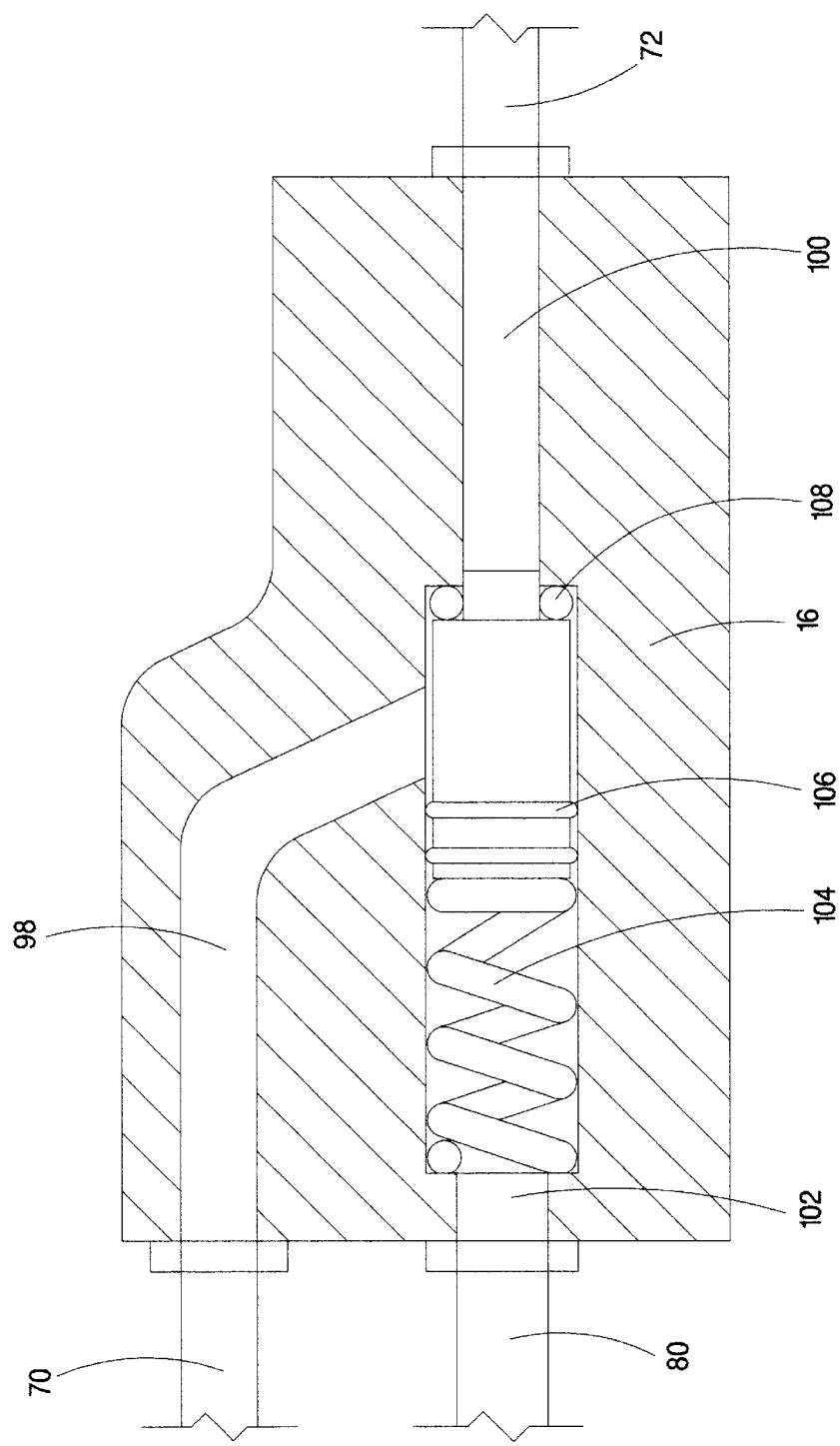
FIG. 2 is a representational view of internal components of a check flow valve, as indicated in FIG. 1.

Preferably, each of the flow controlling valves 14 and 16 are actuated by pilot lines 76 and 80. Referring simultaneously to FIGS. 1 and 2, where hydraulic fluid pressure within hydraulic line 72 exceeds hydraulic fluid pressure within hydraulic line 68, the hydraulic fluid may flow through channel 100 within check flow valve 16, driving plug 106 leftwardly against compression spring 104 until the rightward end of plug 106 moves past the opening of channel 98. The hydraulic fluid then may flow through channel 98, and thence through hydraulic line 70, to emit into space 32 of left cylinder 2. Conversely, where hydraulic fluid pressure within line 68 is greater than pressure within hydraulic line 72, pressure from pilot line 80 drives plug 106 rightwardly, delaying the flow of hydraulic fluid through hydraulic line 70. Preferably, plug 106 has 0-rings 108 applied thereto forming occlusive seals between the plug 106 and the surrounding housing.

Spring 104 preferably holds plug 106 in a normal position wherein channel 98 remains partially opened for return flow.

Flow controlling check valve 14 operates identically with valve 16, allowing hydraulic fluid pressure from pilot line 76 to close valve 14 delaying hydraulic fluid flow through hydraulic line 66.

Referring again to FIG. 1, it is preferable that hydraulic fluid pressure within each of hydraulic lines 66, 68, 70, and 72 be relieved and cushioned by floating piston-cushioned cylinders 6, 8, 10, and 12. Each such floating piston cylinder has a hydraulic fluid space 88, a gas receiving space 94, and a floating piston 92 partitioning the hydraulic fluid from the gas. Preferably, input of hydraulic fluid into space 88 is controlled by an adjustable valve 86 while ball valve 90 permits unrestricted outflow of hydraulic fluid from space 88. A one way air valve 96 allows pressurized gas to be injected into space 94. Preferably, nitrogen is utilized. The structures of floating piston cylinders 6, 8 and 10 are identical with that of floating piston cylinder 12.

Preferably, the hydraulic fluid receiving spaces of floating piston cylinders 6, 8, 10, and 12 are respectively made contiguous with the bores of hydraulic lines 66, 70, 68 and 72 by means of hydraulic lines 78, 74, 82 and 84. Suitably, transmission of hydraulic fluid into and out of the hydraulic fluid receiving spaces of cylinders 6, 8, 10, and 12 may be achieved by other means such as direct connection to the walls of cylinders 2 and 4.

Suitably, other combinations and configurations of floating cylinder pistons 6, 8, 10, and 12 may be utilized; however, utilization of all four such cylinders situated as depicted in FIG. 1 is preferred. Through utilization of floating cylinder pistons 6, 8, 10, and 12, a period of pressure differential between check flow valve pilot lines 76 and 80 and main flow lines 68 and 70 is assured, resulting in leveling of an automobile through turns.

Suitably, the present inventive assembly may be applied solely to an automobile's front wheels, or solely to its rear wheels. However, preferably, the assembly is installed dually, both to an automobile's front and rear wheels.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An automobile stabilizing assembly comprising:
   (a) a right cylinder having a hydraulic fluid filled interior space, the hydraulic fluid filled interior space of the right cylinder having a first end and a second end, the right cylinder having a first and a second wall spanning across its hydraulic fluid filled interior space, such first and second walls defining a first chamber, the first wall of the right cylinder having a piston shaft receiving aperture extending therethrough, the right cylinder having first and second hydraulic fluid exchange ports extending into its first chamber;
   (b) a right piston assembly comprising a first piston slidably mounted within the first chamber of the right cylinder, and comprising a right piston shaft extending through the piston shaft receiving apertures of the first wall of the right cylinder, the right piston shaft being fixedly attached to said first piston, said first piston being positioned for sliding motion between the first and second hydraulic fluid exchange ports of the right cylinder;
   (c) a left cylinder having a hydraulic fluid filled interior space, the hydraulic fluid filled interior space of the left cylinder having a first end and a second end, the left cylinder having a first and a second wall spanning across its hydraulic fluid filled interior space, such first and second walls defining a first chamber, the first wall of the left cylinder having a piston shaft receiving aperture extending therethrough, the left cylinder having first and second hydraulic fluid exchange ports extending into its first chamber;
   (d) a left piston assembly comprising a first piston slidably mounted within the first chamber of the left cylinder, and comprising a left piston shaft extending through the piston shaft receiving apertures of the first wall of the left cylinder, the left piston shaft being fixedly attached to said first piston, said first piston being positioned for sliding motion between the first and second hydraulic fluid exchange ports of the left cylinder;
   (e) a first hydraulic fluid carrying tube interconnecting the first hydraulic fluid exchange port of the right cylinder and the second hydraulic fluid exchange port of the left cylinder;
   (f) a second hydraulic fluid carrying tube interconnecting the second hydraulic fluid exchange port of the right cylinder and the first hydraulic fluid exchange port of the left cylinder;
   (g) right and left floating piston gas cushion cylinders;
   (h) means for transmitting fluid pressure from the first chamber of the right cylinder to the right floating piston gas cushion cylinder; and,
   (i) means for transmitting fluid pressure from the first chamber of the left cylinder to the left floating piston gas cushion cylinder.

2. The automobile stabilizing assembly of claim 1 wherein the right cylinder further comprises a third wall defining in combination with the second wall a second chamber; wherein the left cylinder further comprises a third wall defining in combination with the second wall of the left cylinder a second chamber of the left cylinder; wherein the right piston assembly further comprises a second piston having at least a first motion damping channel therethrough, the right piston shaft extending through the second wall of the right cylinder to interconnect the first piston of the right cylinder with the second piston of the right cylinder; and wherein the left piston assembly further comprises a second piston having at least a first motion damping channel therethrough; the left piston shaft extending through the second wall of the left cylinder to interconnect the first piston of the left cylinder with the second piston of the left cylinder.

3. The automobile stabilizing assembly of claim 1 wherein each right and left cylinder has an upper end and a lower end, each such upper and lower end being adapted for fixed and pivotal attachment to the chassis or wheel support arm of an automobile.

4. The automobile stabilization assembly of claim 3 wherein each first piston is imperforate.

5. The automobile stabilization assembly of claim 4 further comprising first and second pilot lines, the first pilot line interconnecting the first pilot controlled check valve and the second hydraulic fluid carrying tube, the second pilot line interconnecting the second pilot controlled check valve and the first hydraulic fluid carrying tube.

6. The vehicle stabilization assembly of claim 5 wherein each of the means for transmitting fluid pressure comprises a hydraulic line.

7. The vehicle stabilization assembly of claim 6 wherein each floating piston gas cushion cylinder comprises a gas retaining check valve.

8. The vehicle stabilization assembly of claim 7 wherein each pilot controlled check valve comprises a spring biased plug, each such plug being slidably movable in response to fluid pressure from one of the pilot lines.

* * * * *